United States Patent

[11] 3,618,874

[72] Inventors Dale O. Kettering
Canton;
James L. McWhorter, East Sparta, both of Ohio
[21] Appl. No. 47,304
[22] Filed June 18, 1970
[45] Patented Nov. 9, 1971
[73] Assignee Diebold, Incorporated
Canton, Ohio

[54] PNEUMATIC CARRIER LATCH SENSING DEVICE
7 Claims, 11 Drawing Figs.
[52] U.S. Cl. .................................................. 243/19,
243/38, 243/16
[51] Int. Cl. .................................................. B65g 5/32
[50] Field of Search .......................................... 243/16, 19, 24, 38

[56] References Cited
UNITED STATES PATENTS
3,189,297 6/1965 Ellithorpe ..................... 243/19
3,231,218 1/1966 Tearne ......................... 243/19 X
3,417,941 12/1968 Stieber ......................... 243/24 X

*Primary Examiner*—Harvey C. Hornsby
*Assistant Examiner*—Merle F. Maffei
*Attorney*—Frease & Bishop

ABSTRACT: An electrical sensing construction for material-conveying carriers and related terminal stations in pneumatic tube systems, particularly for conducting banking transactions. Electrical sensing coils are mounted in opposite ends of one carrier wall. A switch is mounted within each end of the carrier and is connected to each coil. An actuator pin communicates with each switch for opening and closing the switch. A projecting ear on the carrier door depresses the actuator pin when in closed position which opens the switch. An electrical transmitter and receiver each have an associated coil mounted in the terminal station aligned with the carrier coils when the carrier is at rest within the terminal. A signal from the transmitter is received by the receiver when the carrier switch or switches are closed to indicate an open carrier door. The received signal initiates control functions required to prevent premature launching of the carrier into the pneumatic tube system, if a carrier door is open.

PATENTED NOV 9 1971 3,618,874

INVENTORS
Dale O. Kettering and
BY James L. M<sup>c</sup>Whorter

Frease & Bishop
ATTORNEYS

PATENTED NOV 9 1971 3,618,874

INVENTORS
Dale O. Kettering and
BY James L. McWhorter

Frease & Bishop
ATTORNEYS

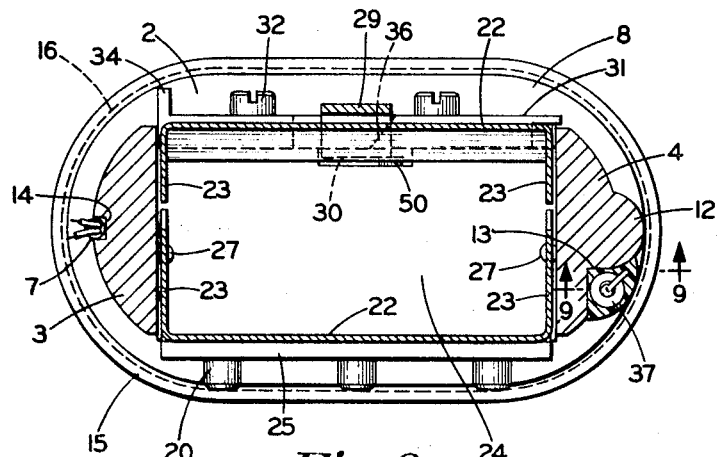
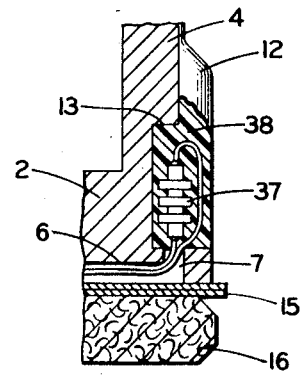
Fig. 8
Fig. 9
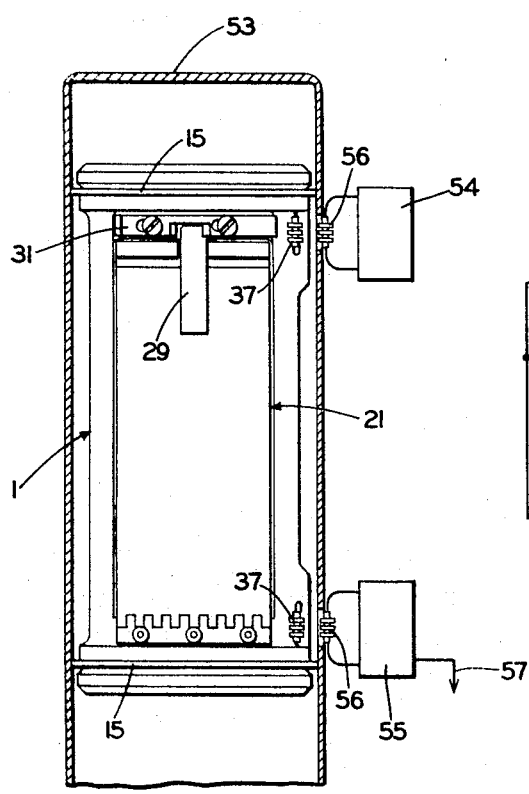
Fig. 10
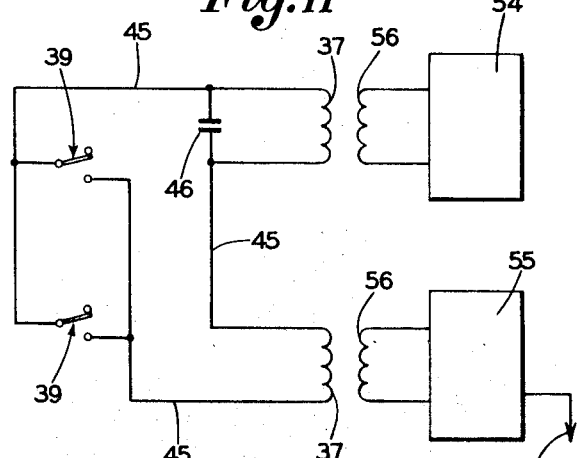
Fig. 11
INVENTORS
Dale O. Kettering and
BY James L. M<sup>c</sup>Whorter
Frease & Bishop
ATTORNEYS

PNEUMATIC CARRIER LATCH SENSING DEVICE

BACKGROUND OF THE INVENTION

1. Field of the Invention

The invention relates to carriers which move through a pneumatic tube system from a remote customer's station in performing banking services. More particularly the invention relates to sensing means located partially within the carrier and partially within the pneumatic tube system terminal. The sensing means provides an electrical interlock and indicates whether a carrier door is closed and properly latched before launching into the pneumatic tube.

2. Description of the Prior Art

Many types of latches for pneumatic tube system carrier doors have been used. There has been no way to detect an open or unlatched carrier door and reject the carrier before launching it into the tube. Thus, carrier contents or a partially open carrier door can cause the carrier to become jammed in the pneumatic tube, disabling the entire system. This necessitates retrieving the carrier and contents from the pneumatic system, causing long delays and inconvenience to bank customers.

Frequently a customer trying to be helpful may close the carrier door upon leaving the customer station, but leaves the outer customer station housing door open. Indicating lights at the remote teller station are normally controlled by movement of such outer door. Thus, the teller has no indication that the carrier door is closed and only has an indication that the outer door is open. The next customer, possibly unfamiliar with the normal condition of the carrier may place his materials improperly into an opening between the carrier and carrier housing. This can block proper operation and require a shutdown for repairs. No known prior carrier construction provides a simple and rugged mechanism eliminating these problems.

SUMMARY OF THE INVENTION

Objectives of the invention include providing a pneumatic tube system carrier latch-sensing device which prevents launching a carrier with an unlatched door into the pneumatic tube; providing a sensing device completely enclosed in the carrier and carrier terminal without projections into the pneumatic tube; providing a sensing device unaffected by repeated sudden stopping and fast acceleration at tube terminals; providing a sensing device which permits carriers without any sensing components to continue to be utilized without affecting their operation or the normal operation of the equipment; providing a sensing device which transmits a signal to the teller station that the carrier door is closed as well as that the outer terminal door is open; and providing a device of simple construction which eliminates maintenance and repair problems, which achieves the stated objects in a simple, effective and inexpensive manner, and which solves problems and satisfies needs existing in the art.

These and other objectives and advantages may be obtained by the carrier door latch-sensing construction, the general nature of which may be stated as including in a pneumatic tube system carrier, spaced side column members, spaced base members integrally joined with and extending across the ends of the column members to form a carrier shell; door means having a generally rectangular closure wall and chutelike sidewalls forming a boxlike payload chamber within the carrier shell; hinge means connecting a carrier base portion with one end of each door means for hinged opening and closing movement of such door means; spring-pressed plungers mounted in the base portions normally urging the door means to open positions; latch means for each door means including a latch member slidably mounted on each base portion, the latch member being normally spring-pressed to latching position; the base portions each being formed with a central cavity and two channels extending laterally therefrom; a shoulder formed along one side of each base portion having a centrally enlarged recess, an aperture extending between the sides of and completely through the base portion communicating with the central cavity; an annular flange surrounds said base having two holes formed therein communicating with the outer ends of the channels; switch means mounted within the central cavity having an actuator arm, and a roller mounted on the end of the actuator arm; and actuator pin having an annular groove and a contact end located within and extending through the aperture; said groove being engaged with the actuator roller when the carrier door is in open position to close the switch, the actuator pin being spring-pressed normally to locate the pin contact end in the enlarged recess; electrical capacitor means mounted in one base cavity and connected to the switch located therein; a channel formed in one side column member extending full length of the column member communicating with one of the holes formed in each outer base flange; the opposite side column being formed with a notch at each end which communicates with the other hole formed in each outer base flange; a choke coil mounted within each notch; wires located within the channels in the base portions and the one side column electrically connecting said coils, switches and capacitor; said wires forming a closed circuit between switches and coils when said switches are in closed positions; a projecting ear at the swinging edge of each door adapted to be engaged by the latch member to hold said ear in the enlarged recess when the door is closed; the ear when the door is closed engaging the contact end of the actuator pin to move said pin to a position releasing the roller from engagement in the pin groove, thereby opening the associated switch; the pneumatic tube system terminal having electrical coils mounted therein, positioned opposite the carrier choke coils when said carrier is at rest within said terminal; an electrical transmitter and receiver, each connected with one of said terminal coils; said receiver actuating a control signal at a remote teller station responsive to the transmitted signal when said carrier door or doors are open.

BRIEF DESCRIPTION OF THE DRAWINGS

A preferred embodiment of the invention — illustrative of the best mode in which applicants have contemplated applying the principles — is set forth in the following description an and shown in the drawings and is particularly and distinctly pointed out and set forth in the appended claims.

FIG. 8 is an enlarged sectional view taken on line 8—8, FIG. 1;

FIG. 9 is a fragmentary sectional view taken on line 9—9, FIG. 8 showing a sensing coil;

FIG. 10 is a diagrammatic view illustrating the carrier located in a pneumatic tube at a terminal station equipped with the latch-sensing device; and FIG. 11 is a wiring diagram of the latch-sensing device.

Similar numerals refer to similar parts throughout the drawings.

DESCRIPTION OF THE PREFERRED EMBODIMENT

Figure 1:
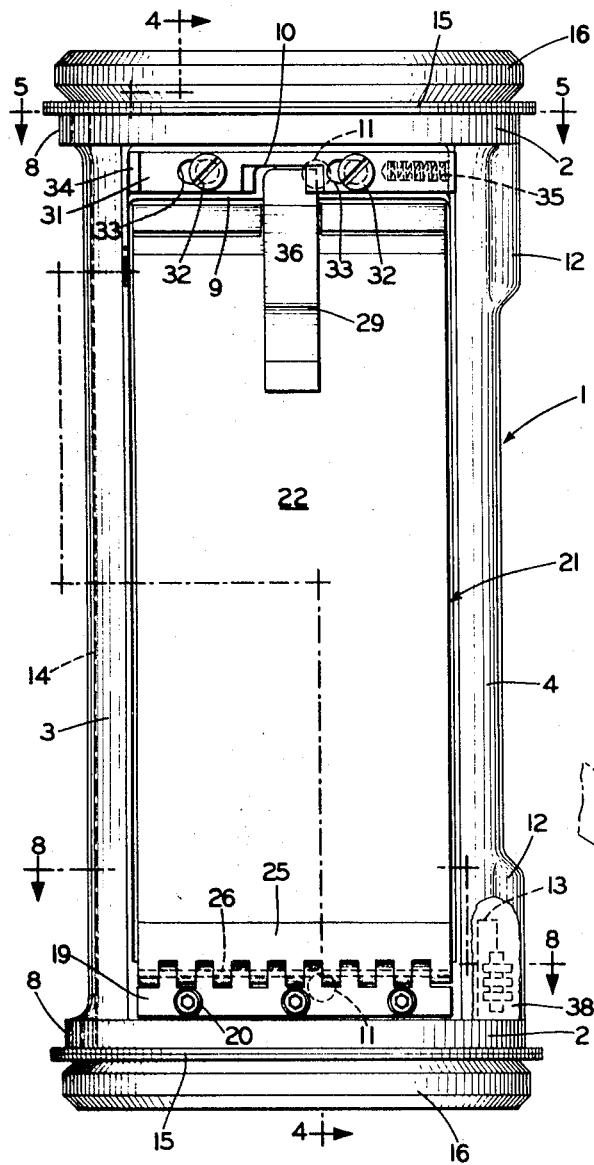
FIG. 1 is a front elevation of a typical carrier utilizing the latch-sensing device in latched position.

Pneumatic tube carrier systems for conducting banking services utilize several types of carriers for traveling between stations. One type of carrier commonly used has an elongated, generally rectangular shell with a closure door at either side such as the carrier described and shown in U.S. Patent No. 3,237,884. Such a carrier, slightly modified, is shown in the drawings equipped with the new latch-sensing device.

Figure 5:
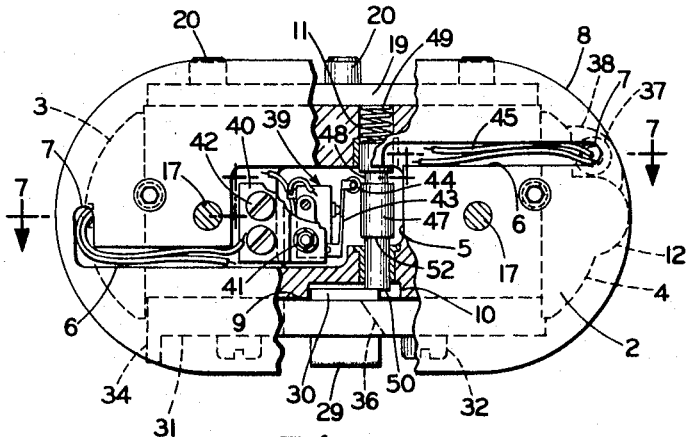
FIG. 5 is an enlarged sectional view with portions broken away taken on line 5—5, FIG. 1 showing the carrier door in latched position.
Figure 7:
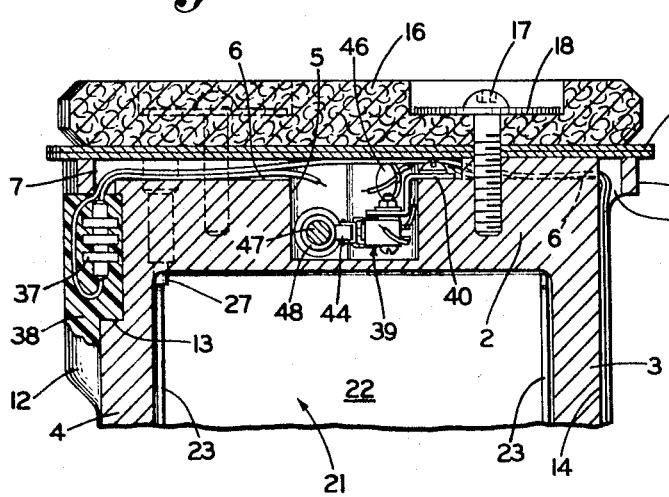
FIG. 7 is a sectional view taken on line 7—7, FIG. 5.

The carrier, indicated generally at 1 (FIG. 1), includes a base member 2 at each end formed integrally with two side column members 3 and 4. Base members 2 each are formed with a central cavity 5 and two channels 6 extending laterally from cavity 5 terminating at holes 7 which are formed through the outer base flange portion 8 (FIGS. 5 and 7). A recess shoulder 9 is formed along the side of the door-engaging surface of base 2 between columns 3 and 4 and shoulder 9 forms a centrally enlarged recess 10. An aperture 11 extends from recess 10 through cavity 5 and the remaining portion of base 2.

Figure 3:
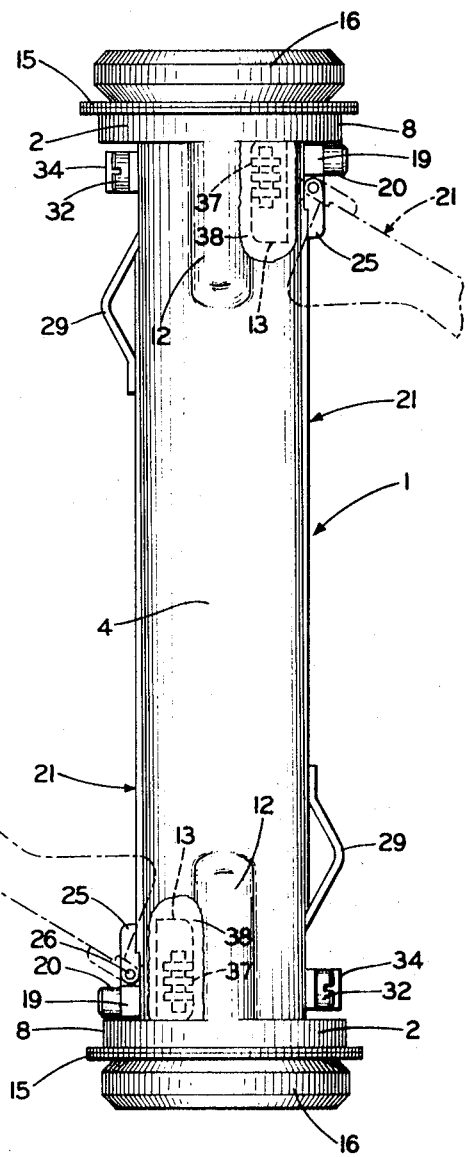
FIG. 3 is a side elevation of the carrier shown in FIGS. 1 and 2.
Figure 4:
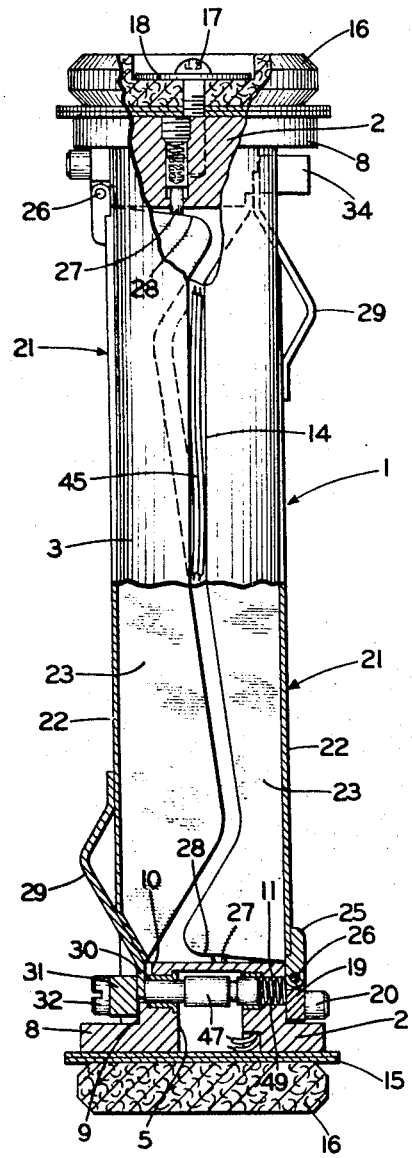
FIG. 4 is a sectional view with portions broke —n away taken on line 4—4, FIG. 1.

An enlarged projection 12 is formed along column 4 extending from each base portion 2 (FIGS. 1 and 3) which may contain magnets (not shown) for other operating control functions not associated with the latch-sensing feature. A notch 13 (FIGS. 8 and 9) is formed in each end 2 and in column 4 adjacent projections 12. Notches 13 are located diagonally of each other in column 4 (FIG. 3). A channel 14 is formed throughout the length of column 3 terminating in holes 7 through bases 2 (FIGS. 4 and 8).

Figure 2:
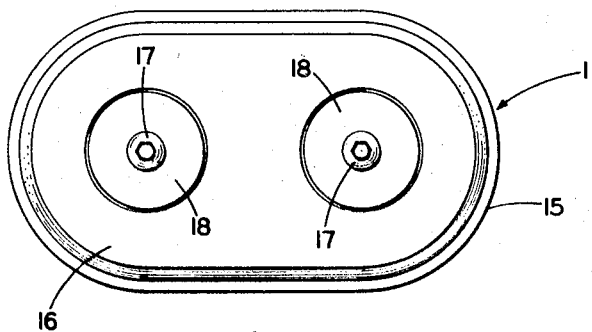
FIG. 2 is a bottom plan view of the carrier shown in FIG. 1.

An accelerating disc 15 and a felt cushion end 16 are mounted on each base 2 by bolts 17 and washers 18 (FIGS. 2 and 7).

A hinge strap 19 is mounted on each base 2 by bolts 20. Door member 21 has a generally rectangular closure wall 22 and chutelike sidewalls 23 which form a rectangular payload-containing chamber 24 (FIG. 8). A hinge strap 15 at one end of wall 22 is hinged to hinge strap 19 by hinge pin 16 (FIGS. 1 and 3). Spring-pressed plungers 27 mounted in each base 2 impart opening movement to door 21 by engaging rear edge 28 of door sidewall 23 (FIG. 4).

A V-shaped runner strip 29 is centrally mounted on door closure wall 22. An ear 30 projects from the end of strip 29 beyond the swinging edge of door 21.

The door latch mechanism includes latch members 31 slidably mounted on bases 2 by bolts 32 extending through elongated slots 33 formed in members 31. Latch 31 has an actuator ear 34 at one end and is spring-pressed by spring 35 at the other end. A tapered latch formation 36 is located intermediate the ends of latch 31 (FIG. 1).

Sensing device components mounted in carrier 1 include an R. F. choke coil 37 located in each column notch 13. Coil 37 preferably is encased in an epoxy or polyester body filler 38 shaped to match the contours of notch 13, base 2 and column 4, and fillers 38 are cemented in notches 13 (FIGS. 3 and 9).

Figure 6:
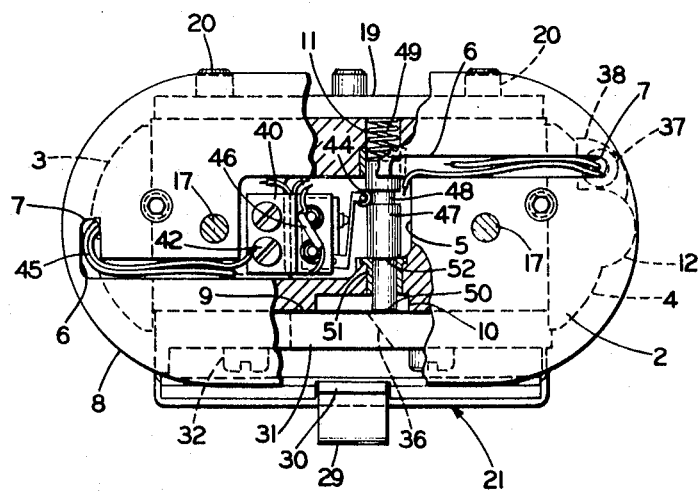
FIG. 6 is a view similar to FIG. 5 showing the carrier door in unlatched position.

A switch 39 is located and mounted in each cavity 5 carried by mounting brackets 40 and bolts 41. Brackets 40 are secured to base members 2 by screws 42 (FIGS. 5, 6, and 7). Each switch 39 has an actuator arm 43 and a roller 44 rotatably mounted at the outer end of the arm. Switch 39 is normally open when actuator arm 43 is in the position of FIG. 5, and closed when arm 43 is in the position of FIG. 6.

Coil terminal wires 45 electrically connect coils 37 and switches 39 as shown in FIG. 11. At each end of carrier 1, a coil 37 is connected to its associated switch 39 by wires 45 extending from notch 13 through hole 7 in flange 8 along channel 6 into cavity 5. Wires 45 also extend from cavity 5 along the other section of channel 6 through a second hole 7 into channel 14 in column 3 (FIG. 7), and along channel 14 to connect with coil 37 and switch 39 at the other end of the carrier. Wires 45 being located in channels 6 and 14 are prevented from damage in use or during carrier travel in the pneumatic tube equipment. A capacitor 46 which makes coils 37 resonant over a range of frequencies is placed in one cavity 5 and connected in the coil and switch circuit, as shown in FIG. 11.

An actuator pin 47 having an annular groove 48 is movably mounted in aperture 11 extending through cavity 5 in each base 2 and engages roller 44. Pin 47 is spring-pressed by spring 49 normally to the position of FIG. 6. The contact end 50 of pin 47 has a reduced diameter formed by shoulder 52, and pin end 50 projects into enlarged recess 10. Bushings 51 for pin 47 may line the interior of aperture 11 to impart free-sliding movement to pin 47 (FIGS. 5, 6, and 7).

Actuator pins 47 at each end of the carrier through rollers 44 control switches 39 and thus provides the means by which the open or shut status of doors 21 is determined. When either door 21 is in open position (FIG. 6), ear 30 on runner strip 29 clears recess 10, and actuator pin 47 is moved by spring 49 until shoulder 52, at the rear of contact end 50, seats against bushing 51. At this time, groove 48 is located so as to engage roller 44 which drops into groove 48, permitting actuating arm 43 to close switch 39.

When door 21 is closed, ear 30 is trapped in recess 10 by latch 31 which is spring-pressed by spring 35 to latching position. The trapped ear 30 moves pin 47 to the position of FIG. 5, actuating roller 44 and arm 43 to open switch 39.

Door 21, latch 31, and actuator pin 47 are each spring-pressed or spring-operated, preventing a false door status indication signal from being transmitted. If door 21 is not securely latched, it will be opened by plunger 27. Also latch 31 is urged to latched position by spring 35 which prevents latch 31 from releasing the door. Likewise, if ear 30 is not securely engaged by latch 31, pin 47 will move to the position of FIG. 6 permitting roller 44 to engage groove 48. Thus, switch 39 will always indicate the opened or closed status of door 21.

The customer terminal 53 for carrier 1 is provided with an electrical transmitter 54 and receiver 55, and coils 56, which are located opposite coils 37 when carrier 1 is located at terminal 53. Transmitter 54 emits electromagnetic wave signals which are transmitted to the opposite coil 37 through coil 56. When either or both carrier switches 39 are closed (doors 21 in open position) the transmitted signal received by the carrier coil 37 opposite transmitter coil 56 causes the second coil 37 to radiate in harmony with first coil 37. The detector or receiver coil 56 detects such radiation in opposite coil 37, indicating that one or both doors 21 are open, and the signal received by coil 56 actuates control signal means 57 which may serve any desired control function.

One manner in which the control signal means 57 activated by receiver 55, indicating an open door, can be utilized is to deactivate the carrier return circuit. Thus, a teller at a remote teller station has no response when the carrier return button is pressed. Another manner in which signal means 57 may be used is to activate a holding circuit preventing a carrier with an open door from being launched into its pneumatic tube.

In the normal operation of remote pneumatic tube banking equipment using the improved carrier latch-sensing device, the teller's console receives an open or close signal as to the status of the outer door (not shown) at the customer terminal. Normally the carrier door 18 is open when the outer terminal door is open and thus the teller's outer door signal of an open outer door should indicate an open carrier door and vice versa. It occasionally happens that a customer upon leaving will close the carrier door without the teller's knowledge. A next customer may inadvertently place his material through the outer door into the terminal and the material may fall into the pneumatic tube and disenable the entire system.

A carrier and terminal equipped with the new latch-sensing device can be operated to prevent such occurrences by interconnecting the carrier control signal circuit from the receiver into the outer door status-indicating circuit. Thus, when the carrier door is closed without the outer terminal equipment door being closed, the outer door "open —" indicating button can be made to flash or pulsate when no signal is being received by the receiver indicating the carrier doors are closed.

The transmitting and receiving equipment normally is located at the customer's terminal since most problems arise at this station. A customer may place too large a parcel in the carrier preventing the carrier door from closing. Premature closing of the carrier door by the customer without the outer door being closed may occur. If desired another transmitter and receiver can be placed at the teller's station to eliminate unlatched carriers at that point.

The new latch-sensing device prevents a teller from prematurely launching a carrier having an open door into the pneumatic tube system which would result in the carrier becoming jammed. The device also can indicate to the teller the existence of an abnormal condition, such as the outer equipment door being open and the inner or carrier door being closed.

Simplicity, convenience and efficiency are enhanced further by the structural arrangement of the wiring and components of the sensing device completely within the carrier body and the terminal. Thus, no components project from the equipment into the tube, and none is accessible to the customer to become damaged or broken.

Economics are achieved in adapting the sensing device to existing carriers and terminals. Only minor structural modifications and production changes in the manufacture of new carriers and terminals are involved. Further, existing carriers, without sensing components, may continue to be used in converted pneumatic tube systems without effecting their operation.

Accordingly, the construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the carrier latch-sensing device is constructed and used, the characteristics of the construction, and the advantageous, new and useful results obtained; the new and useful structures, devices, elements, arrangements, parts, and combinations, are set forth in the appended claims.

We claim:

1. In a pneumatic tube system, a carrier terminal, a carrier having a door adapted to be opened for carrier access when the carrier is located at the terminal, latch means for the door, switch means mounted on the carrier, switch actuator means on the carrier engaged by the door to open the switch means when the door is latched closed, said actuator means being biased to a position closing the switch means when the door is opened, first and second sensing coils mounted in spaced relation on the carrier connected in circuit with the switch means, capacitor means in said circuit, third and fourth coils mounted in the terminal respectively opposite the first and second coils when the carrier is located in the terminal, a transmitter connected with one of the third and fourth coils, and a receiver connected with the other of the third and fourth coils; whereby a signal from the transmitter is transmitted though the coils, switch means and carrier circuit and is received by the receiver when a carrier is located in the terminal and its switch means closed by an opened door.

2. The construction set forth in claim 1 in which the door is hinged to the carrier and biased to open position.

3. The construction set forth in claim 1 in which the latch means includes a slidable latch member and a projection on the door engaged by the latch member, and in which the projection engages the actuator means to open the switch means when the door is latched closed.

4. The construction set forth in claim 1 in which the carrier has spaced end walls, in which the switch means and switch actuator means are mounted in one of the end walls, and in which the first and second sensing coils are mounted one adjacent each end wall.

5. The construction set forth in claim 1 in which the carrier has an end wall, in which a recess is formed in one end wall, in which the door has a projecting ear, in which the latch means engages and traps the ear in said recess when the door is closed, in which the actuator means has a pin which is biased to project into said recess, and in which the ear engages said pin to open the switch means when the door is closed.

The construction defined in claim 1 in which the carrier has two doors, in which switch means and actuator means are mounted on the carrier for each door, and in which the switch means for each door is connected in the sensing coil circuit; whereby the opening of either door closes its switch means to close the sensing coil circuit.

7. The construction defined in claim 1 in which control signal means is provided connected with the receiver adapted to be actuated by receipt of a door open signal by the receiver.

* * * * *